(12) United States Patent
Yamashita

(10) Patent No.: US 8,913,819 B2
(45) Date of Patent: Dec. 16, 2014

(54) OBSERVATION APPARATUS AND OBSERVATION METHOD

(75) Inventor: Yusuke Yamashita, Tokyo (JP)

(73) Assignee: Olympus Corporation, Tokyo (JP)

( * ) Notice: Subject to any disclaimer, the term of this patent is extended or adjusted under 35 U.S.C. 154(b) by 55 days.

(21) Appl. No.: 13/308,731

(22) Filed: Dec. 1, 2011

(65) Prior Publication Data

US 2012/0141036 A1 Jun. 7, 2012

(30) Foreign Application Priority Data

Dec. 3, 2010 (JP) ................................ 2010-270400

(51) Int. Cl.
G06K 9/20 (2006.01)
G06K 9/62 (2006.01)
G06K 9/00 (2006.01)

(52) U.S. Cl.
CPC .......... G06K 9/6289 (2013.01); G06K 9/00134 (2013.01)
USPC ........................................................ 382/133

(58) Field of Classification Search
None
See application file for complete search history.

(56) References Cited

U.S. PATENT DOCUMENTS

| | | | |
|---|---|---|---|
| 6,078,681 A | 6/2000 | Silver | |
| 6,337,474 B1 | 1/2002 | Morizono | |
| 7,078,663 B2 | 7/2006 | Takamizawa | |
| 7,986,824 B2 | 7/2011 | Suzuki et al. | |
| 8,139,106 B2 * | 3/2012 | Maiya | 348/79 |
| 8,280,142 B2 | 10/2012 | Suzuki et al. | |
| 8,520,213 B2 | 8/2013 | Popescu et al. | |
| 2007/0070498 A1 | 3/2007 | Endo et al. | |
| 2009/0290156 A1 | 11/2009 | Popescu et al. | |
| 2011/0001815 A1 * | 1/2011 | Nakano et al. | 348/79 |
| 2011/0049370 A1 * | 3/2011 | Yoshida et al. | 250/354.1 |

FOREIGN PATENT DOCUMENTS

| | | |
|---|---|---|
| DE | 20 2008 004 271 U1 | 5/2008 |
| JP | 2005-149397 A | 6/2005 |
| JP | 2008139487 A | 6/2008 |
| JP | 2008139488 A | 6/2008 |
| JP | 2011013610 A | 1/2011 |
| WO | WO 2006/106882 A | 10/2006 |

OTHER PUBLICATIONS

Related U.S. Appl. No. 12/828,342; First Named Inventor: Mitsuhiro Nakano; Title: "Microscope Apparatus"; filed Jul. 1, 2010.
CCD based pH Imaging Sensor, Mimura et al, Electron Devices Meeting, 1997, IEDM '97, Technical Digest, International, pp. 915-918.
Japanese Office Action dated Jun. 3, 2014 issued in counterpart Japanese Application No. 2010-270400.

* cited by examiner

Primary Examiner — Brian P Werner
(74) Attorney, Agent, or Firm — Holtz, Holtz, Goodman & Chick PC

(57) ABSTRACT

An observation apparatus compares a plurality of image information acquired in a specific time by a plurality of image acquisition methods whose image acquisition timings are different, and includes a timer for counting observation time, and a PMT and a CCD whose image information acquisition timings are different. A storage unit stores different image information, when acquired by the PMT and the CCD, by relating each type of the acquired image information to the observation information counted by the timer. A control unit sets a display standard to associate the different types of image information stored in the storage unit, according to the observation time that has been respectively related to these types of image information, and associates the different types of image information according to the time information, on the basis of the set display standard. A monitor displays the image information associated by the control unit.

11 Claims, 16 Drawing Sheets

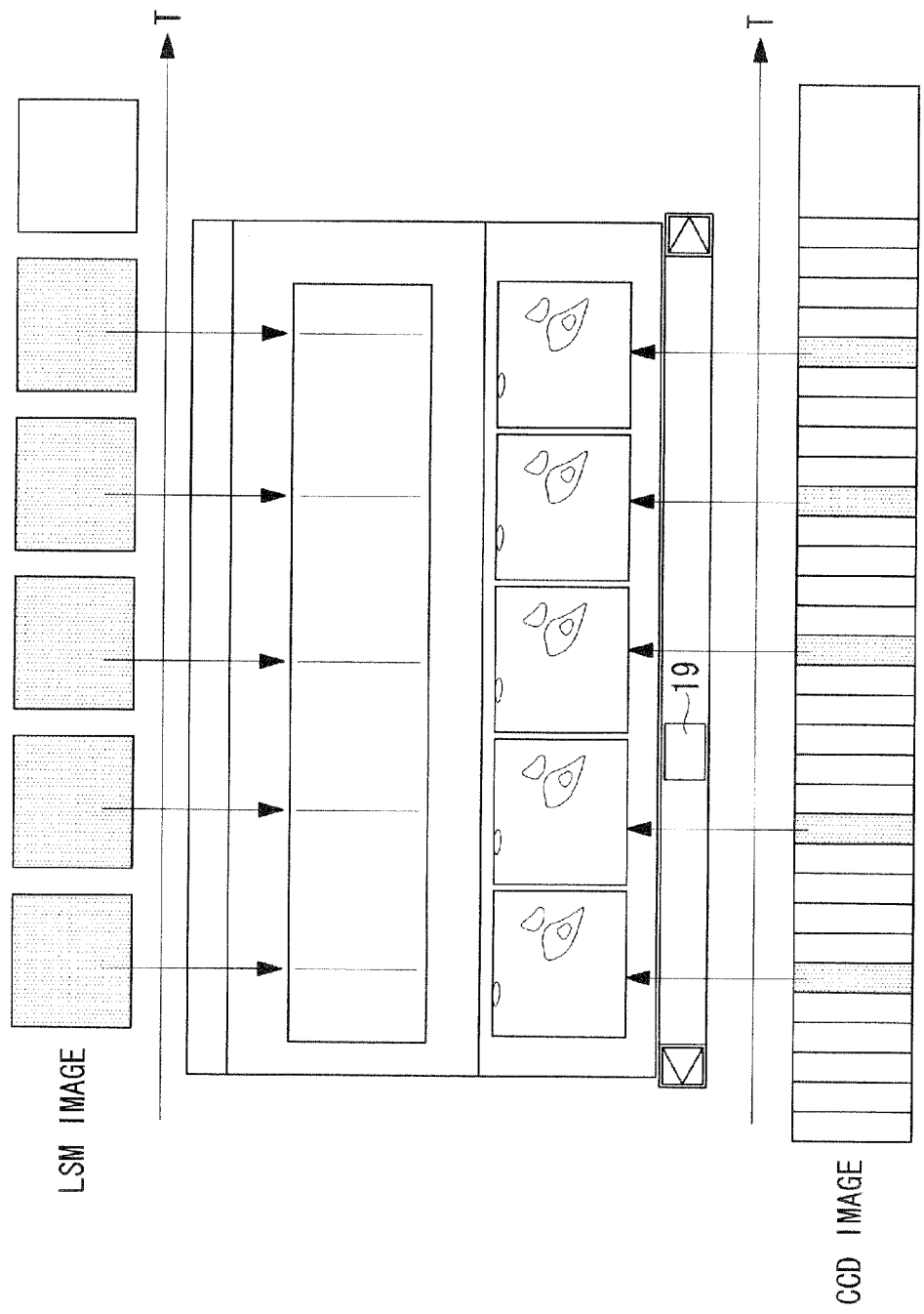

OBSERVATION APPARATUS AND OBSERVATION METHOD

TECHNICAL FIELD

The present invention relates to an observation apparatus and an observation method.

BACKGROUND ART

Heretofore, a microscope apparatus has been known which makes an association of a plurality of image data acquired by different image acquisition methods with each other and stores them as a single image data file (for example, refer to Patent Literature 1).

CITATION LIST

Patent Literature

{PTL 1}
Japanese Unexamined Patent Application, Publication No. 2005-149397

SUMMARY OF INVENTION

Technical Problem

The microscope apparatus described in Patent Literature 1 sequentially executes each image acquisition method by switching over between a plurality of image acquisition methods, then makes an association between pieces of image data acquired at different times by respective of these image acquisition methods, and stores the data in the thus associated manner; however, there is no association of each piece of image data acquired by the respective image acquisition method with the observation time. For this reason, in a case where a specimen is subjected to time-lapse observation by simultaneously using a plurality of image acquisition methods whose image acquisition timings are different, like an LSM (laser scanning microscope) device and a CCD; it is not possible to mutually compare these different types of image data acquired in a specific time by these image acquisition methods.

It is an object of the present invention to provide an observation apparatus and an observation method which make it possible to readily compare and observe a plurality of types of image information acquired in a specific time by a plurality of image acquisition methods whose image acquisition timings are different.

Solution to Problem

A first aspect of the present invention is an observation apparatus which comprises: a timer for counting time information; a plurality of image information acquisition units whose acquisition timings to acquire image information of a specimen are different; a storage unit for storing different types of image information, when acquired by these image information acquisition units, by respectively relating each type of the acquired image information to the time information counted by the timer; a standard setting unit for setting a standard to make a mutual association between the different types of image information that have been stored in the storage unit, according to the time information that has been respectively related to these types of the image information; an image processing unit for making a mutual association between the different types of image information according to the time information, on the basis of the standard that has been set by the standard setting unit; and a display unit for displaying the image information associated by the image processing unit.

According to the first aspect mentioned above: different types of image information of a specimen acquired by a plurality of image information acquisition units are respectively related to time information counted by the timer, and stored in the thus related manner by the storage unit; and these different types of image information are mutually associated with each other by using the common time information as a clue, on the basis of a standard that has been set by the standard setting unit, by the image processing unit. Accordingly, different types of image information acquired as per respectively different acquisition timings depending on the respective image information acquisition units can be mutually associated with each other along a common time line, and displayed in the thus associated manner by the display unit. This makes it possible to readily compare and observe different types of image information of a specimen acquired in a specific time by a plurality of image information acquisition units whose acquisition timings are different.

In the first aspect mentioned above, the plurality of image information acquisition units may have different resolutions.

By having such a configuration, it becomes possible to observe details of the specimen in a specific time by using a type of image information acquired by an image information acquisition unit whose image resolution is higher, while observing the entire movement of the specimen by using another type of image information acquired by an image information acquisition unit whose acquisition timing is quicker.

In addition, in the first aspect mentioned above, the image processing unit may make a mutual association between the different types of image information, on the basis of a preset time interval as a standard.

By having such a configuration, it becomes possible to mutually compare and observe different types of image information acquired in a specific time by different image information acquisition units, as per the thus preset time interval.

Moreover, in the first aspect mentioned above, the image processing unit may make a mutual association between the different types of image information, on the basis of an acquisition timing of any one of the image information acquisition units as a standard.

By having such a configuration, it becomes possible to observe the specimen by using a type of image information acquired by an image information acquisition unit whose acquisition timing has been set as the standard, while comparing it with another type of image information acquired by a different image information acquisition unit, in a specific time.

Furthermore, in the first aspect mentioned above, the image processing unit may make the mutual association between the different types of image information, at every preset number of pieces of the image information of the image information acquisition unit which is employed as the standard, according to the acquisition timing thereof.

By having such a configuration, it becomes possible, in a case where a large size of image information has been acquired, to facilitate the observation of the specimen by reducing the number of pieces of image information to be displayed on the display unit. For example, it is effective in cases where the movement of the specimen makes a little change.

Moreover, in the first aspect mentioned above, the display unit may display the different types of image information that have been acquired at a plurality of preset timings, by laying them side by side.

By having such a configuration, it becomes possible to mutually compare and observe in a chronological order different types of image information of a specimen that have been acquired by the respective image information acquisition units at a plurality of preset timings thereof.

In this case, it is also possible that the display unit displays the different types of image information along a common time line.

In addition, in the first aspect mentioned above, if any one of the image information acquisition units has acquired no piece of the image information in a time corresponding to the standard, the image processing unit may make an association by using a piece of image information acquired in a nearest time.

Moreover, in the first aspect mentioned above, if any one of the image information acquisition units has acquired no piece of the image information in a time corresponding to the standard, the image processing unit may make an association by using image information which indicates that no such information has been acquired.

Furthermore, in the first aspect mentioned above, the display unit may display the image information by shifting from parts to parts in the order of the acquisition time.

By having such a configuration, it becomes possible to carry out a comparative observation by focusing a particular part of image information in a specific time.

In addition, in the first aspect mentioned above, any one of the image information acquisition units may acquire a type of image information which indicates a one-dimensional luminance distribution on the specimen, while another one of the image information acquisition units may acquire a type of image information which indicates a two-dimensional luminance distribution on the specimen.

By having such a configuration, it becomes possible to acquire and compare types of image information adopting different modes by using different image information acquisition units.

A second aspect of the present invention is an observation method which comprises: an image information acquisition step for acquiring image information of a specimen as per a plurality of different acquisition timings; a storing step for storing a plurality of types of the image information that have been acquired by the image information acquisition step, by respectively relating each type of them to time information; an image processing step for making a mutual association between the different types of image information that have been stored by the storing step, according to the time information that has been respectively related to these types of the image information; and a display step for displaying the image information associated by the image processing step.

According to the present invention: different types of image information acquired by the image information acquisition step are respectively related to time information, and stored in the thus related manner by the storing step; and these different types of image information are mutually associated with each other by using the common time information as a clue, by the image processing step. Accordingly, different types of image information acquired as per respectively different acquisition timings can be mutually associated with each other along a common time line, and displayed in the thus associated manner in the display step. This makes it possible to readily compare and observe different types of image information of a specimen acquired as per a plurality of different image acquisition timings in a specific time.

Advantageous Effects of Invention

The present invention can offer an effect of enabling to readily compare and observe a plurality of types of image information acquired in a specific time by a plurality of image acquisition methods whose image acquisition timings are different.

BRIEF DESCRIPTION OF DRAWINGS

FIG. 14B is a diagram showing a profile image of line scanning of FIG. 14A.

DESCRIPTION OF EMBODIMENTS

Hereunder is a description of an observation apparatus and an observation method according to one embodiment of the present invention with reference to drawings.

Figure 1:
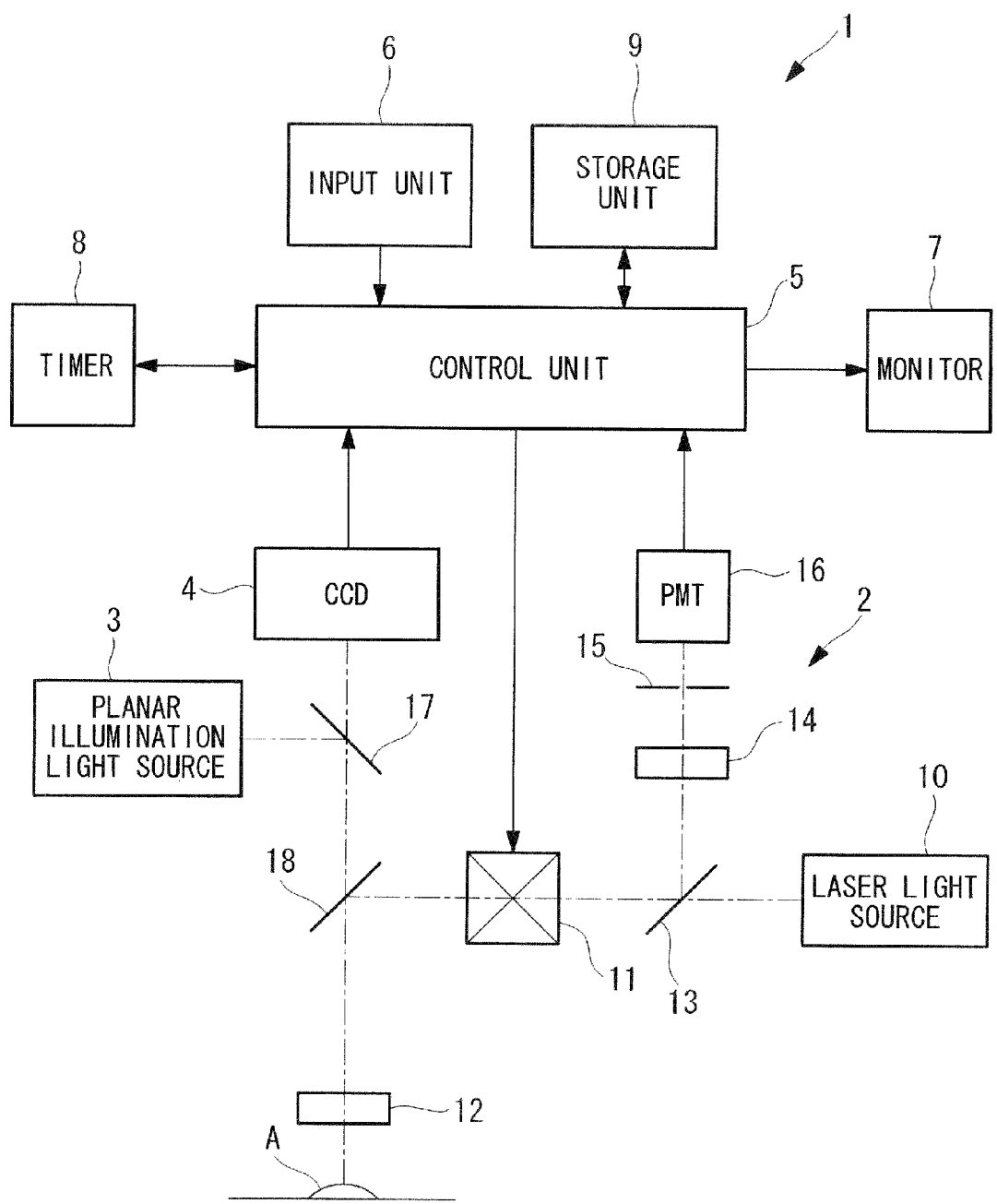
FIG. 1 is a block diagram showing a microscope apparatus according to one embodiment of the present invention.

As shown in FIG. 1, a microscope apparatus (observation apparatus) 1 of this embodiment comprises an LSM device 2, a planar illumination light source 3 attached to the LSM device 2, a CCD (image information acquisition unit) 4, an input unit 6 for inputting a command to start the observation, or the like, by the user, a control unit (standard setting unit, image processing unit) 5 for controlling the LSM device 2 and the CCD 4, a monitor (display unit) 7 for displaying image information acquired by the LSM device 2 and the CCD 4, and the like, a timer 8 for counting the observation time (time information), and a storage unit 9 for storing the image information acquired by the LSM device 2 and the CCD 4, and the like.

The LSM device 2 is a confocal microscope. This LSM device 2 comprises: a laser light source 10 for emitting a laser beam; a scanner 11 for moving the laser beam emitted from the laser light source 10 to scan in a two dimensional manner; an object lens 12 for focusing the laser beam moved by the scanner 11 on a specimen A and collecting fluorescent light generated from the specimen A; a dichroic mirror 13 for branching the fluorescent light that has been collected by the object lens 12 and is returning back through the scanner 11, out from the optical path of the laser beam; a condenser lens 14 for condensing the fluorescent light branched out by the dichroic mirror 13; a confocal pinhole 15 positioned at the focal point of the condenser lens 14; and a PMT (photomultiplier tube, image information acquisition unit) 16 for detecting the fluorescent light passing through the confocal pinhole 15. In the diagram, the reference sign 18 denotes a dichroic mirror.

The scanner 11 is, for example, a so-called proximal galvano mirror comprising a pair of independently oscillatable galvano mirrors (not shown). The scanner 11 is designed to receive a command regarding the position to irradiate the laser beam, from the control unit 5. The scanner 11 can drive the respective galvano mirrors to be arranged at an appropriate oscillation angle according to the command from the control unit 5.

The planar illumination light source 3 emits planar illumination light to irradiate the specimen A. The object lens 12 focuses the planar illumination light emitted from the planar illumination light source 3 on the specimen A, and collects fluorescent light generated from the specimen A. The CCD 4 captures the fluorescent light collected by the object lens 12.

The input unit 6 comprises a keyboard, a mouse, a joystick, or the like, to be handled by the user. It is possible for the user, by handling the input unit 6, not only to make a command to start the observation, but also to input an acquisition condition for acquiring image information by the LSM device 2 and the CCD 4, a display standard for displaying image information on the monitor 7, and the like.

The acquisition condition for image information can be exemplified by the range of the oscillation angle of the scanner 11 which serves as the range of acquisition for LSM image information, the timing to acquire LSM image information (interval), the number of pieces of LSM image information to be acquired, the timing to acquire CCD image information (interval), the number of pieces of CCD image information to be acquired, and the like.

The display standard for image information can be exemplified by a display standard for showing a display as per the acquisition timing of image information of the LSM device 2, a display standard for showing a display as per the acquisition timing of image information of the CCD 4, or a display standard for showing a display as per the time interval optionally set by the user.

When receiving fluorescence brightness information (image information) from the PMT 16 of the LSM device 2, the control unit 5 sequentially stores the brightness information by relating it to the position and the oscillation angle of the scanner 11. By so doing, the control unit 5 can generate two-dimensional LSM image information.

Moreover, the control unit 5 can generate two-dimensional CCD image information by receiving a picture signal from the CCD 4.

Figure 2:
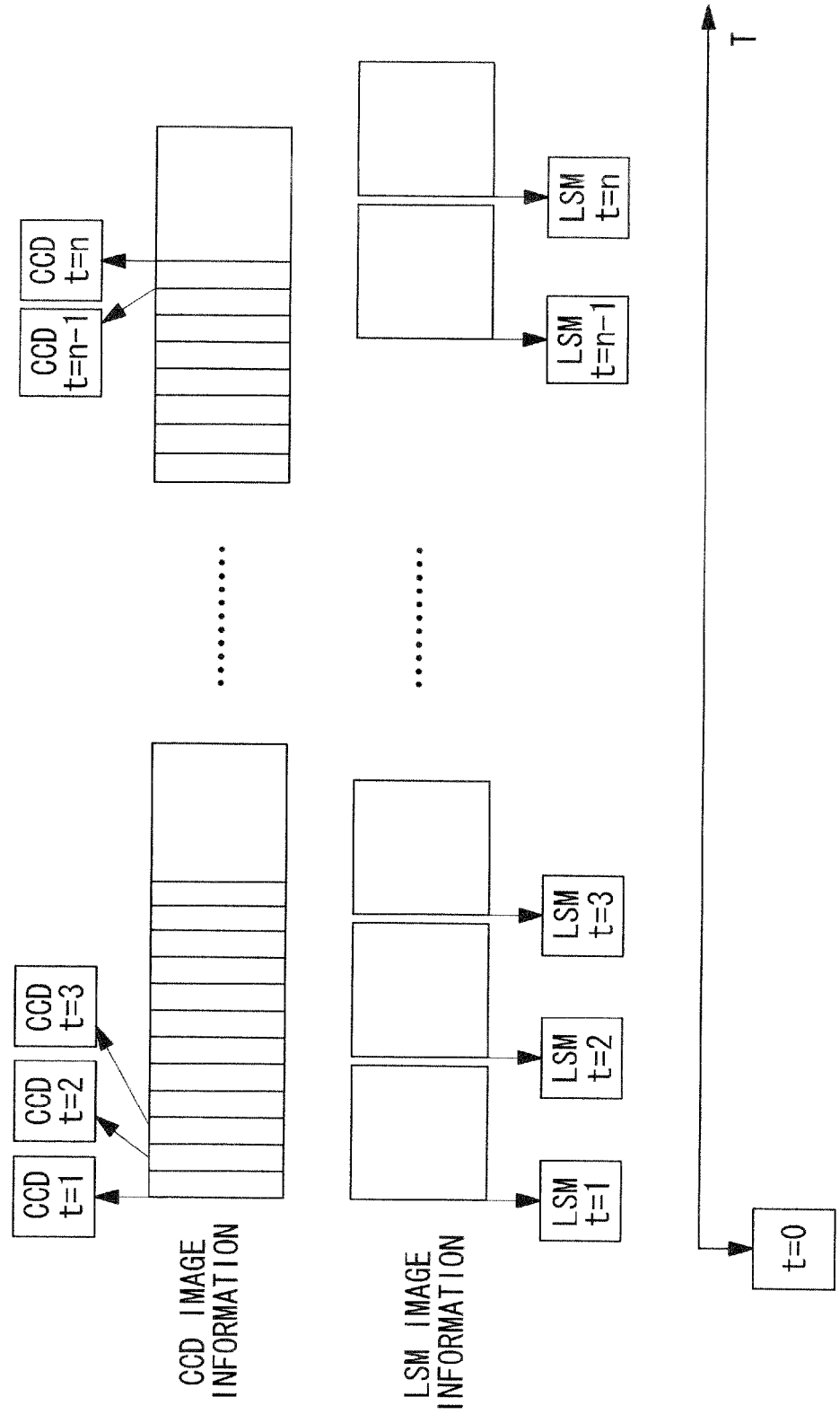
FIG. 2 is a time chart showing an example of image information acquired by the microscope apparatus of FIG. 1.

Furthermore, as shown in FIG. 2, when the reception of the fluorescence brightness information from the PMT 16 of the LSM device 2 is started, the control unit 5 receives the time information from the timer 8 at the same time of the reception, and relates it to the generated LSM image information. Similarly, when the reception of the picture signal from the CCD 4 is started, the control unit 5 receives the time information from the timer 8 at the same time of the reception, and relates it to the generated CCD image information.

In FIG. 2, the CCD image information and the LSM image information are respectively composed of single two-dimensional images. In addition, the CCD image information is obtained at relatively short time intervals as compared to the LSM image information; because of which, in this diagram, the CCD image information is shown by a plurality of approximately square two-dimensional images that are partially overlapped, while the LSM image information is shown by a plurality of approximately square two-dimensional images that are not overlapped but have gaps therebetween.

Moreover, the control unit 5 sets the display standard for image information that has been input into the input unit 6 by the user. On the basis of the display standard, the control unit 5 makes an association between the LSM image information and the CCD image information stored in the storage unit 9 by using the common time information, which has been respectively related to the LSM image information and the CCD image information, as a clue. Furthermore, the control unit 5 calls up the LSM image information and the CCD image information from the storage unit 9, and displays them in the thus associated manner along a common time line on the monitor 7.

The monitor 7 displays the LSM image information and the CCD image information by respectively layouting them in a one dimensional manner.

The timer 8 starts to count the observation time in response to a command to start the observation which has been input from the input unit 6.

The storage unit 9 stores pairs of time information and image information which have been related to each other by the control unit 5, by aligning them according to the order of the time information. In this case, it suffices only if the time information includes information which indicates the time counted by the timer 8 from the start of the observation.

Figure 3:
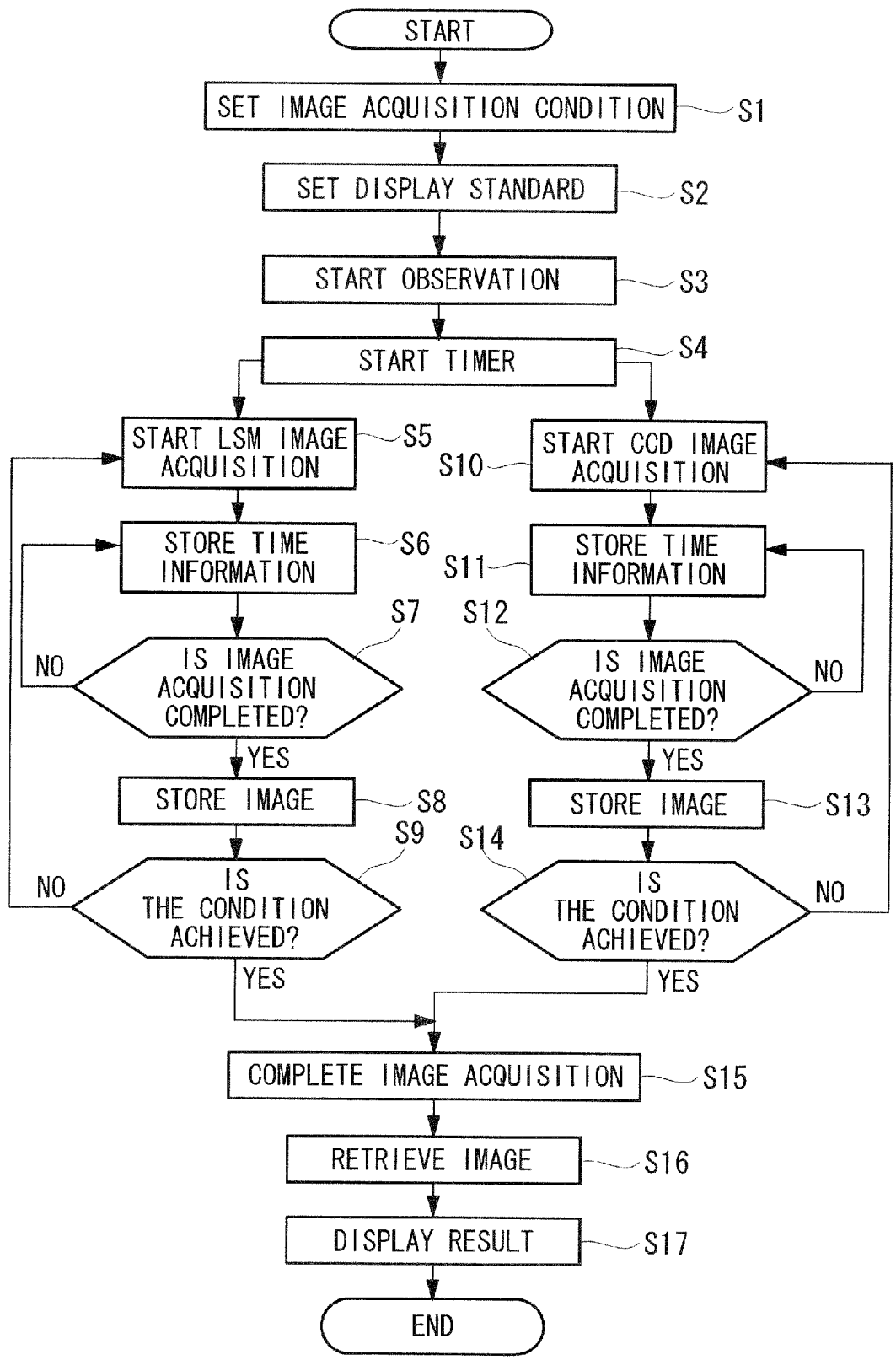
FIG. 3 is a flowchart which describes the observation method by using the microscope apparatus of FIG. 1.

Next, the observation method according to this embodiment using the thus configured microscope apparatus 1 will be described below with reference to the flowchart of FIG. 3.

The observation method according to this embodiment comprises: image information acquisition steps S5 and S10 for acquiring image information of a specimen by the PMT 16 and the CCD 4; storing steps S8 and S13 for storing the LSM image information that has been acquired by the PMT 16 and the CCD image information that has been acquired by the CCD 4 in the image information acquisition steps S5 and S10, by respectively relating each type of them to the time information counted by the timer 8, into the storage unit 9; an image processing step S16 for making an association between the LSM image information and the CCD image information that have been stored in the storing unit 9 by the storing steps S8 and S13, according to the time information that has been respectively related to these two types of image information; and a display step S17 for displaying the LSM image information and the CCD image information in the thus associated manner by the image processing step S16, on the monitor 7.

In order to observe the specimen A by using the thus configured microscope apparatus 1 and the observation method, firstly, the user handles the input unit 6 to input the acquisition condition for LSM image information, the acquisition condition for CCD image information, and the display standard for image information, by which the conditions for acquiring the respective types of image information are set (step S1), and the standard for displaying the image information is set (step S2), by the control unit 5.

Next, the user handles the input unit 6 to make a command to start the observation (step S3), by which the timer 8 starts to count the time (step S4, t=0 in FIG. 2). Also, the acquisition of LSM image information by the LSM device 2 and the acquisition of CCD image information by the CCD 4 are started in parallel according to the respective acquisition conditions for the image information.

LSM image information is acquired (step S5) by operating the laser light source 10 to emit a laser beam, and by operating the scanner 11 to move the laser beam irradiated on the specimen A through the scanner 11 and the object lens 12 to thereby scan the specimen A in a two dimensional manner.

In the specimen A irradiated with the laser beam, fluorescent substances are excited to generate fluorescent light. The generated fluorescent light is collected by the object lens 12. The returning light on the way back through the dichroic mirror 18 and the scanner 11 is branched by the dichroic mirror 13. The branched light is condensed by the condenser lens 14. Out of the fluorescent light condensed by the condenser lens 14, a portion passing through the confocal pinhole 15 is detected by the photodetector 16.

When the acquisition of LSM image information is started, the time information read out by the timer 8 at the same time of the acquisition is stored in the storage unit 9 (step S6). Thereafter, time is allowed by the control unit 5 until the acquisition of LSM image information is completed (step S7). The thus acquired LSM image information is related to the time information that has been stored in the step S5, and stored in the thus related manner (step S8).

The control unit 5 determines whether or not a preset number of pieces of LSM image information according to the acquisition condition have been acquired (step S9). If the number is not achieved (NO in step S9), the steps S5 to S9 are repeated again. If the preset number of pieces of LSM image information have been acquired (YES in step S9), the process to acquire LSM image information is completed (step S15).

On the other hand, CCD image information is acquired by operating the planar illumination light source 3 to emit planar illumination light and irradiate the specimen A with the planar illumination light passing through the object lens 12. Fluorescent substances existing in the specimen A are excited by the irradiation of the planar illumination light onto the specimen A, and thereby fluorescent light is generated. The generated fluorescent light is collected by the object lens 12 and captured by the CCD.

When the acquisition of CCD image information is started (step S10), the time information read out by the timer 8 at the same time of the acquisition is stored in the storage unit 9 (step S11). Thereafter, time is allowed by the control unit 5 until the acquisition of CCD image information is completed (step S12), and the acquired CCD image information is related to the time information that has been stored in the step S11, and stored in the thus related manner (step S13).

Then, the control unit 5 determines whether or not a preset number of pieces of CCD image information according to the acquisition condition have been acquired (step S14). If the number is not achieved (NO in step S14), the steps S10 to S14 are repeated again. If the preset number of pieces of CCD image information have been acquired (YES in step S14), the process to acquire CCD image information is completed (step S15).

Next, the control unit 5 retrieves the LSM image information and the CCD image information stored in the storage unit 9, and make a mutual association between corresponding pieces of image information, by using the common time information that has been respectively related to these pieces of the image information as a clue, according to the preset display standard (step S16). Then, the control unit 5 calls up the corresponding pieces of LSM image information and CCD image information, then makes mutual associations therebetween along a common time line, and displays them in the thus associated manner (step S17).

Figure 4:
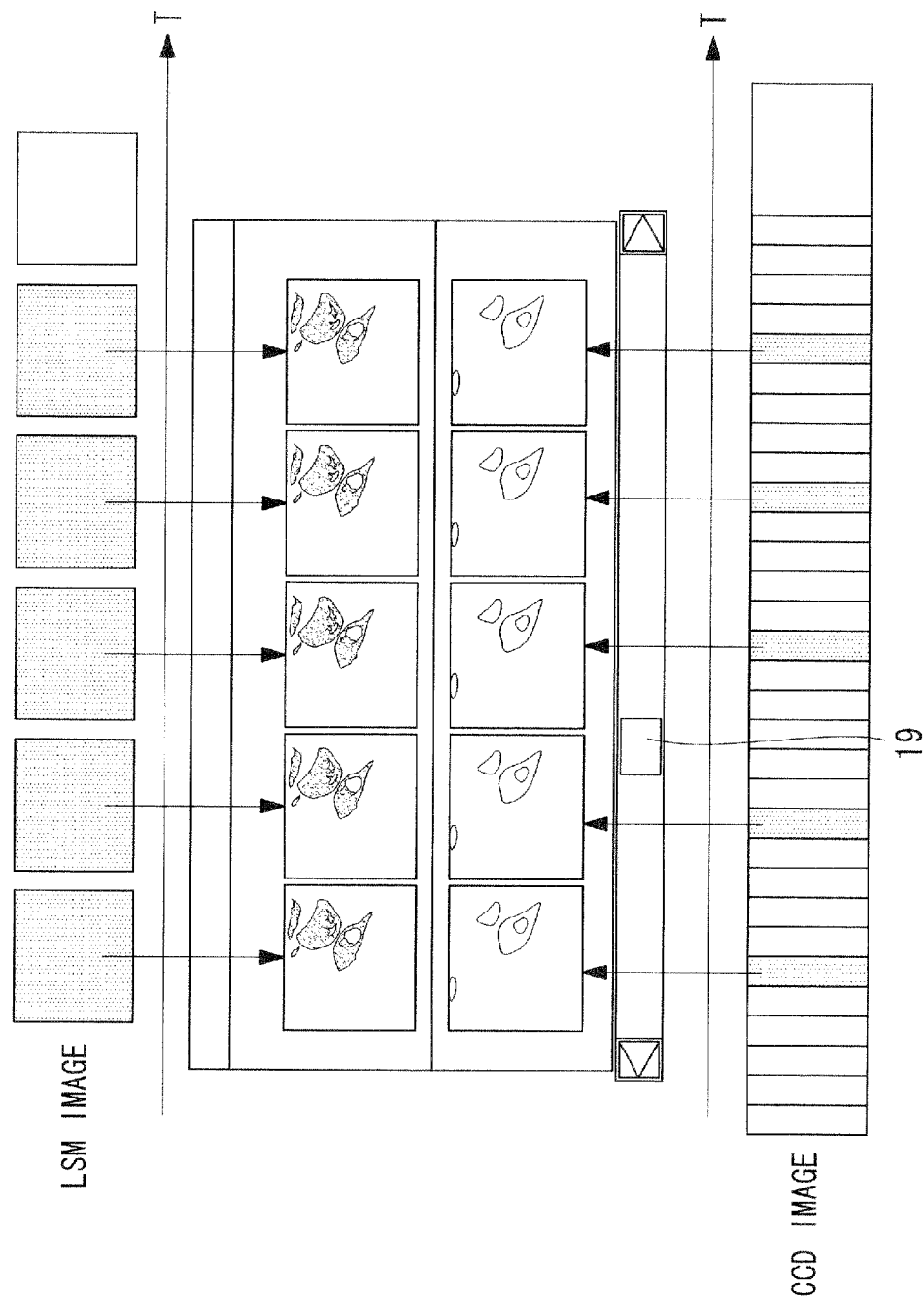
FIG. 4 is a diagram showing an example of image information displayed on the basis of the acquisition timing of LSM image information as a display standard.

For example, in a case where the display standard is set to show the display as per the acquisition timing of the LSM device 2; then, on the monitor 7 as shown in FIG. 4, all pieces of the LSM image information are displayed successively in the order of the acquisition time, while only some pieces of CCD image information, whose acquisition times approximately correspond to the acquisition times of the respective LSM images (standard time) are called up and displayed.

In this case, the timing to acquire image information of the CCD 4 is quicker than that of the LSM device 2, meaning that a plurality of pieces of CCD image information are acquired within a period when one piece of LSM image information is acquired. For this reason, some pieces of CCD image information which are read out per every several steps in the order of the acquisition time, from all pieces of the CCD image information, are displayed on the monitor 7.

If it is not possible to display all the acquired image information at once on the monitor 7, the image information can be displayed by showing parts of the image information in sequence along the acquisition time using the scroll denoted by the reference sign 19.

Figure 5:
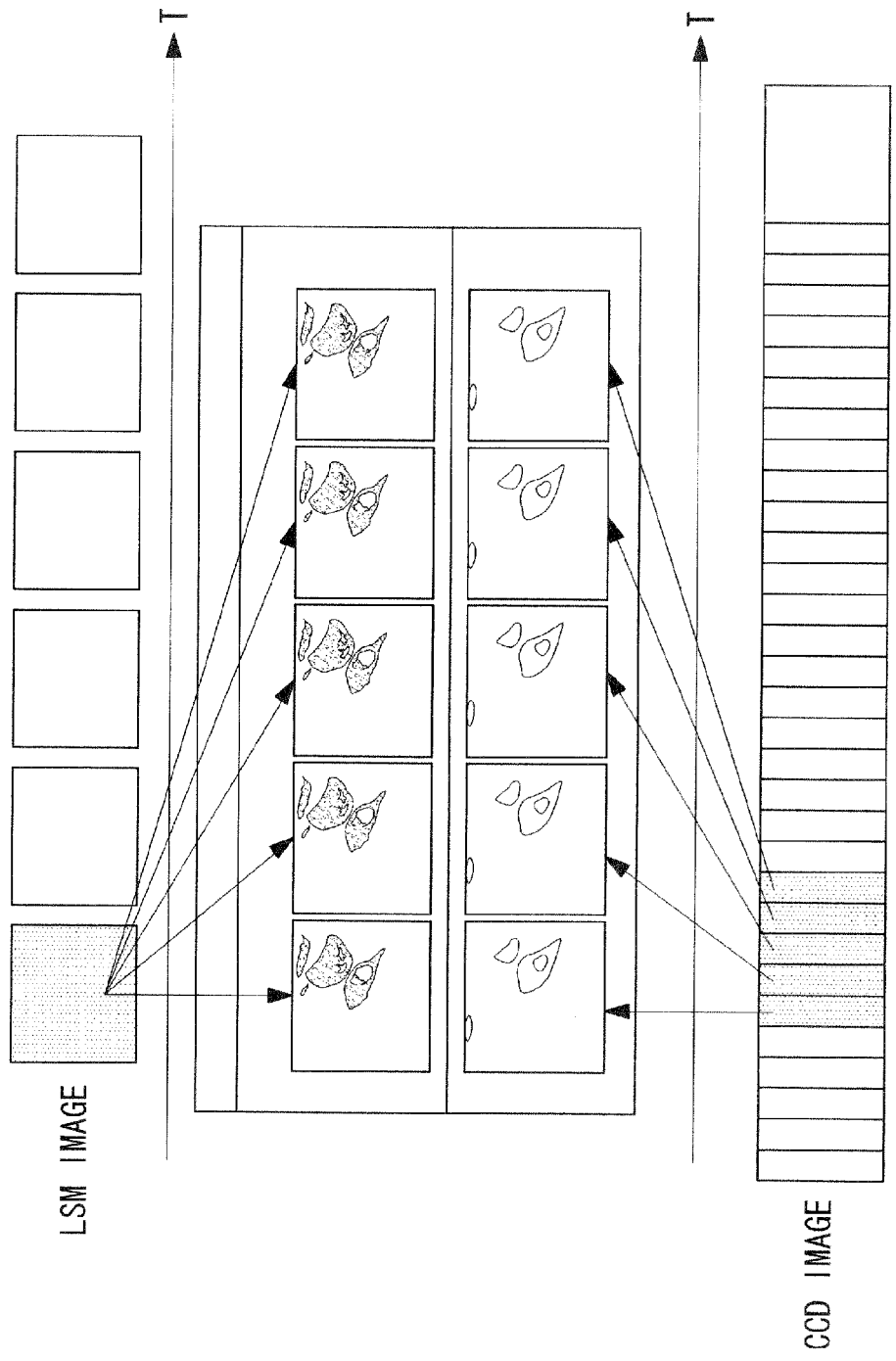
FIG. 5 is a diagram showing an example of image information displayed on the basis of the acquisition timing of CCD image information as a display standard.

In addition, for example, in a case where the display standard is set to show the display as per the acquisition timing of the CCD 4; then, on the monitor 7 as shown in FIG. 5, all pieces of the CCD image information are displayed successively in the order of the acquisition time, while only some pieces of LSM image information, whose acquisition times approximately correspond to the acquisition times of the respective CCD images (standard time), are called up and displayed. In this case, one piece of LSM image information is acquired within a period when a plurality of pieces of CCD image information are acquired. Therefore, for example, a plurality of pieces (five pieces in FIG. 5) of CCD image information which have been acquired at different acquisition times are respectively associated to only one same piece of LSM image information, and these are displayed in the thus associated manner.

By so doing, details of the specimen A in a specific time can be observed by using LSM image information acquired by the LSM device 2 whose image resolution is higher than the CCD 4, while the movement of the specimen A can be observed by using CCD image information acquired by the CCD 4 whose time resolution is higher than the LSM device 2.

Figure 6:
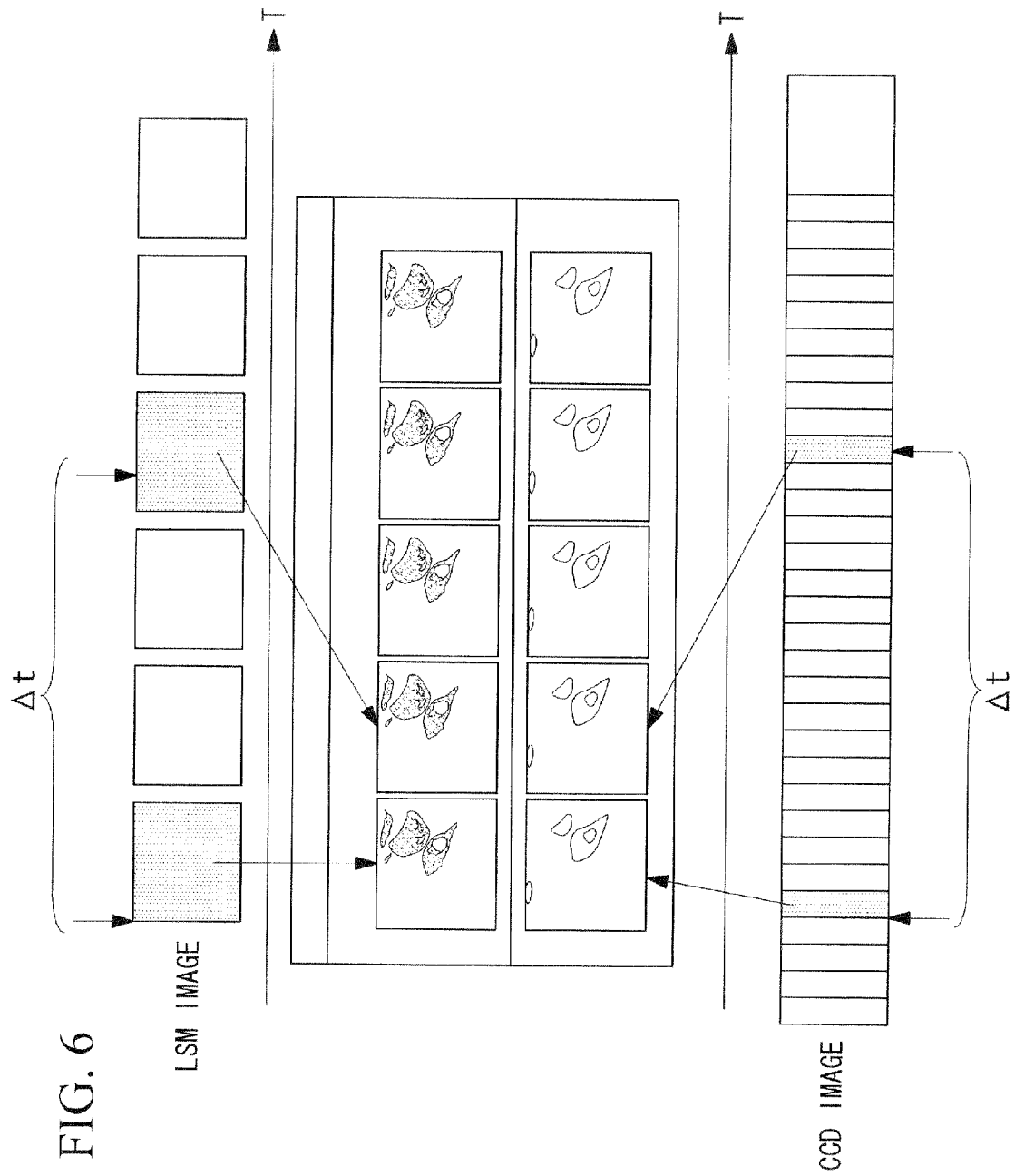
FIG. 6 is a diagram showing an example of image information displayed as per the time interval optionally set by the user as a display standard.

Furthermore, for example, in a case where the display standard is set to show the display as per the time interval optionally set by the user; then, on the monitor 7 as shown in FIG. 6, some pieces of LSM image information and some pieces of CCD image information, whose acquisition times respectively correspond to the standard time adopting the thus set time interval ($\Delta t$ in the diagram), are called up and displayed. By so doing, different types of image information acquired in a specific time by the PMT 16 and the CCD 4 can be mutually compared and observed as per the preset time interval.

As described above, according to the microscope apparatus 1 and the observation method of this embodiment, even in a case where different types of image information, like those of the LSM device 2 and the CCD 4, are acquired individually at totally unassociated acquisition timings, it possible to readily compare and observe the different types of image information of the specimen A acquired in a specific time by the LSM device 2 and the CCD 4. By so doing, a desired observation can be conducted in a specific time by utilizing the difference in the time resolution and the image resolution between the LSM device 2 and the CCD 4.

Figure 7:
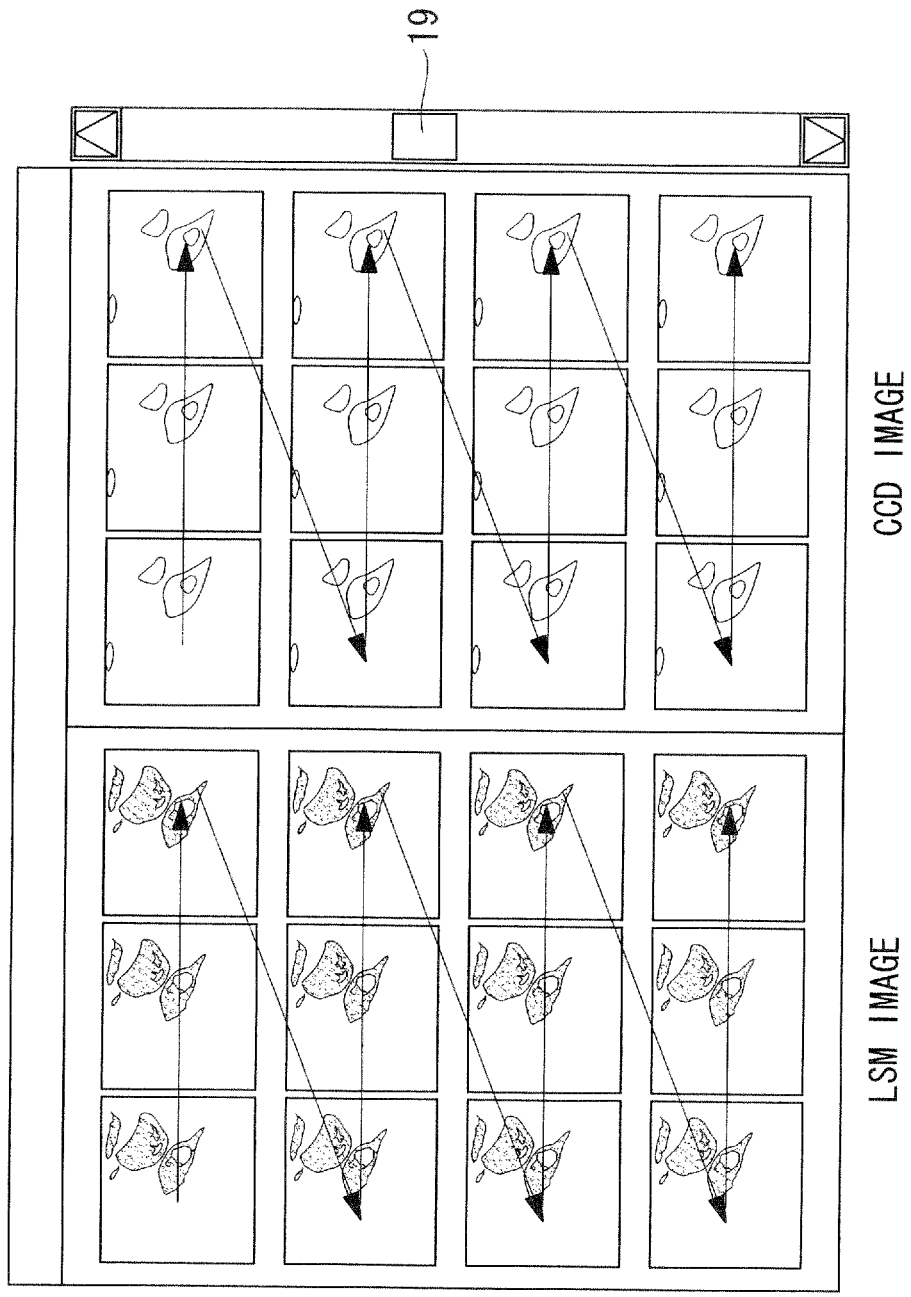
FIG. 7 is a diagram showing an example of image information displayed in a two dimensional manner.

In this embodiment, these types of image information in the forms of two-dimensional images are respectively layouted and displayed in a one dimensional manner (for example, in X direction) on the monitor 7. However, as shown in FIG. 7, it is also possible to layout and display them in a two dimensional manner (in X direction and Y directions). In this case, for example, images may be turned around in the Y direction while being aligned in the X direction in the order of the acquisition time. Moreover, a scroll 19 for shifting the display in the Y direction may be provided so that the image information can be displayed by shifting from parts to parts along the acquisition time.

Figure 8:
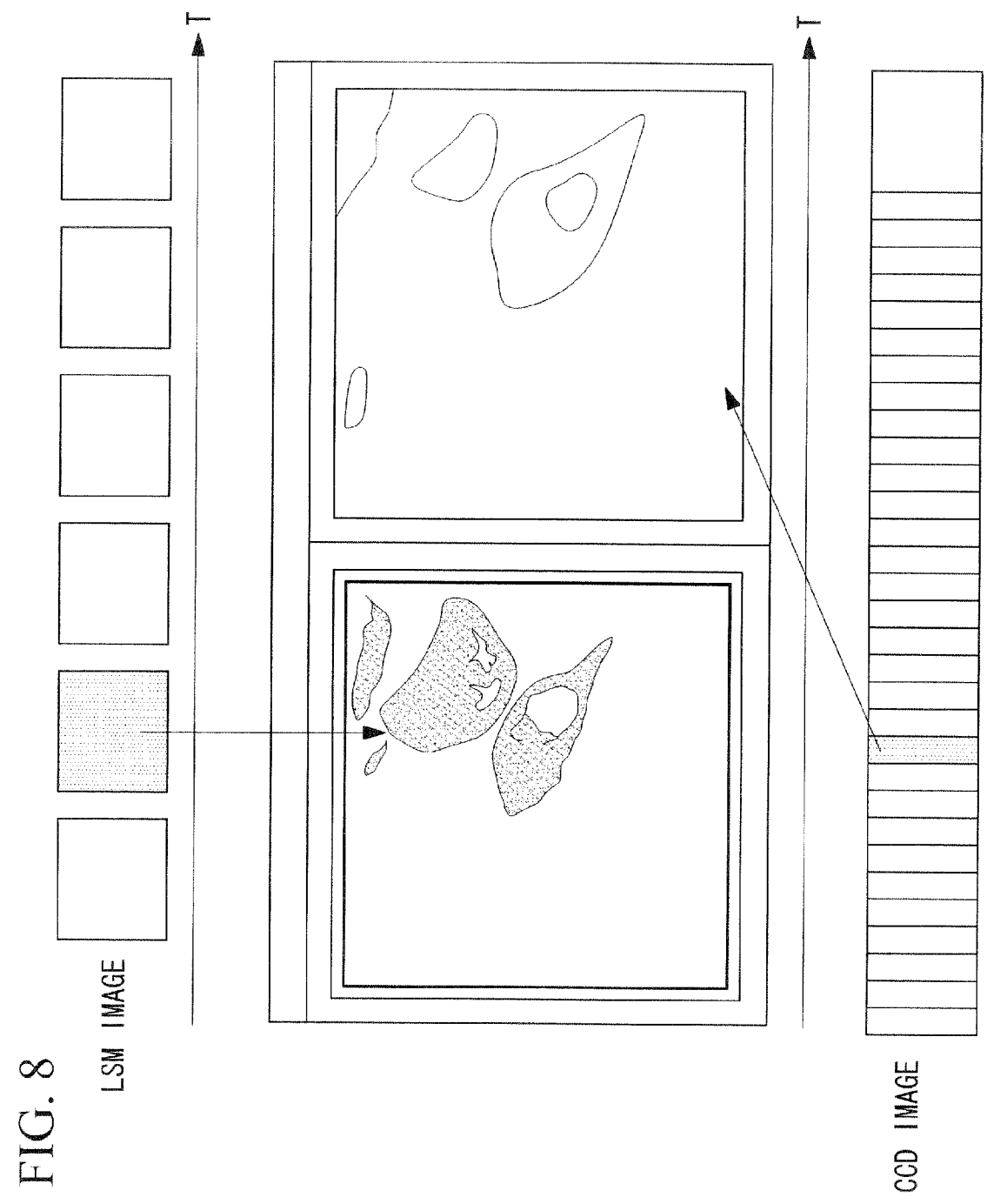
FIG. 8 is a diagram showing an example of image information displayed through frame-by-frame playback.

Moreover, for example, as shown in FIG. 8, it is also possible that only one piece of the LSM image information and only one piece of the CCD image information can be displayed at once on the monitor 7, and the image information to be displayed can be shifted through frame by frame playback in the order of the acquisition time along a common time line.

Figure 9:
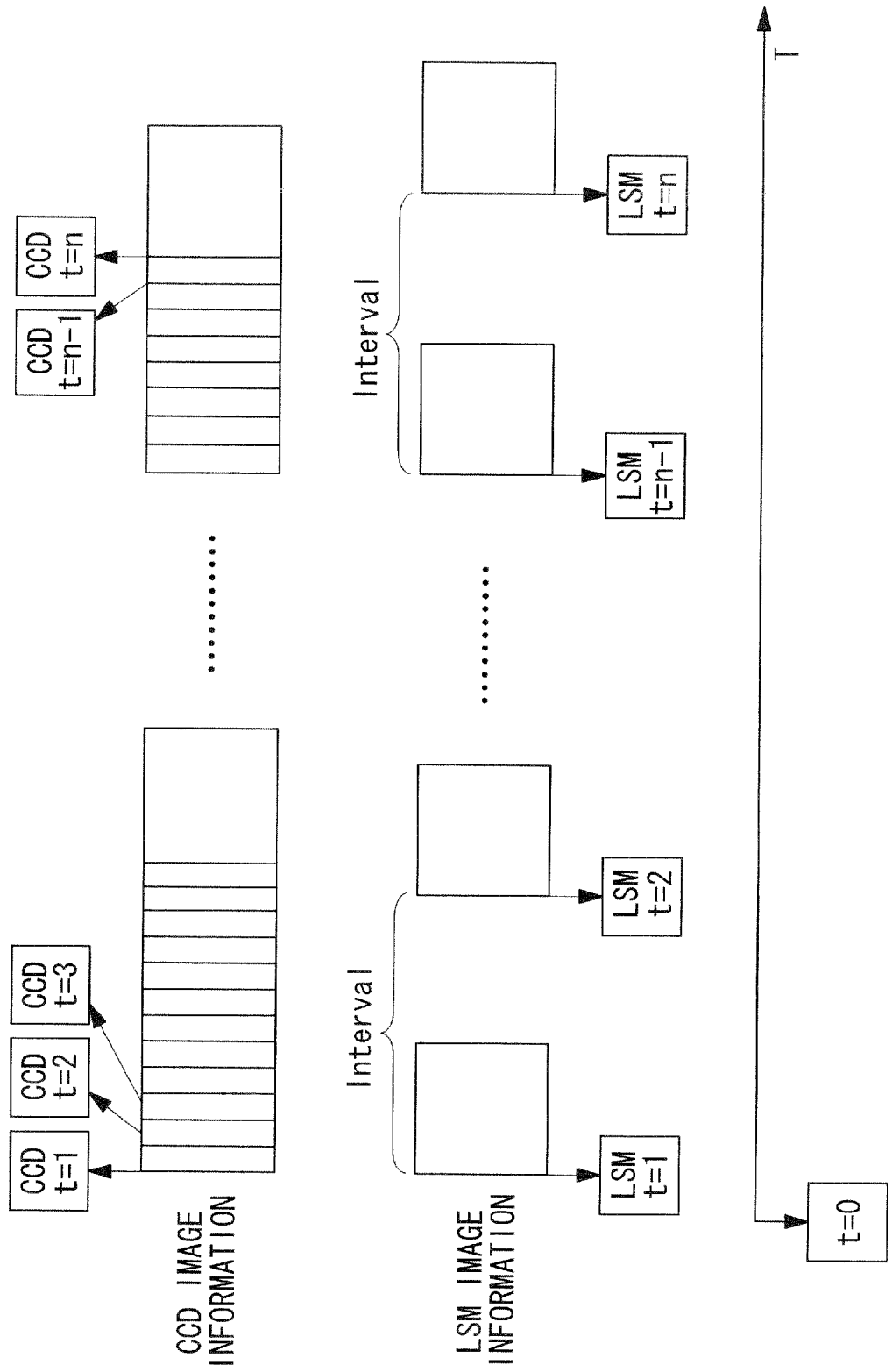
FIG. 9 is a time chart showing an example of image information acquired by a time-lapse observation having blank intervals.

Furthermore, this embodiment has been described by exemplifying the time-lapse observation having no blank interval, meaning a kind of observation in which image information is acquired without allowing a blank time interval as a condition to acquire the image information. However, for example, it is also possible for either one or both of the LSM device 2 and the CCD 4 to conduct a different kind of time-lapse observation which allows blank intervals. FIG. 9 is a time chart showing a case where the CCD image information is acquired by such a time-lapse observation having no blank interval, while the LSM image information is acquired by the different kind of time-lapse observation which allows blank intervals.

In addition, in this embodiment, in a case where the display standard is set to show the display as per the acquisition timing of the LSM device 2 or the CCD 4, all pieces of the image information acquired by the LSM device 2 or the CCD 4 serving as the standard are displayed successively in the order of the acquisition time. However, for example, it is also possible to show the display at every preset number of pieces (every several steps) of image information according to the acquisition timing of the LSM device 2 or the CCD 4 serving as the standard.

Figure 10:
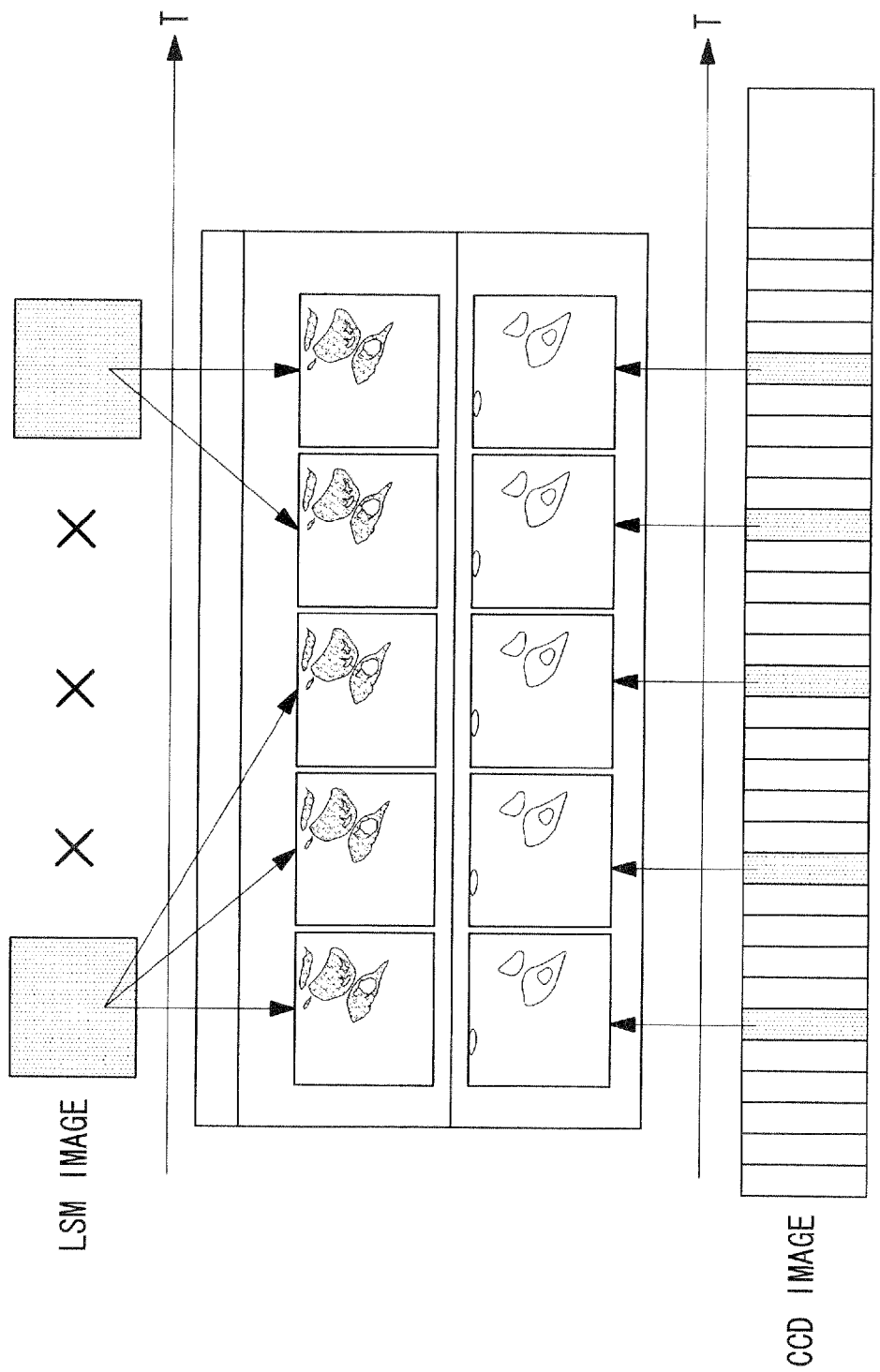
FIG. 10 is a diagram showing an example in which one same piece of image information acquired is repetitively displayed in a standard time.
Figure 11:
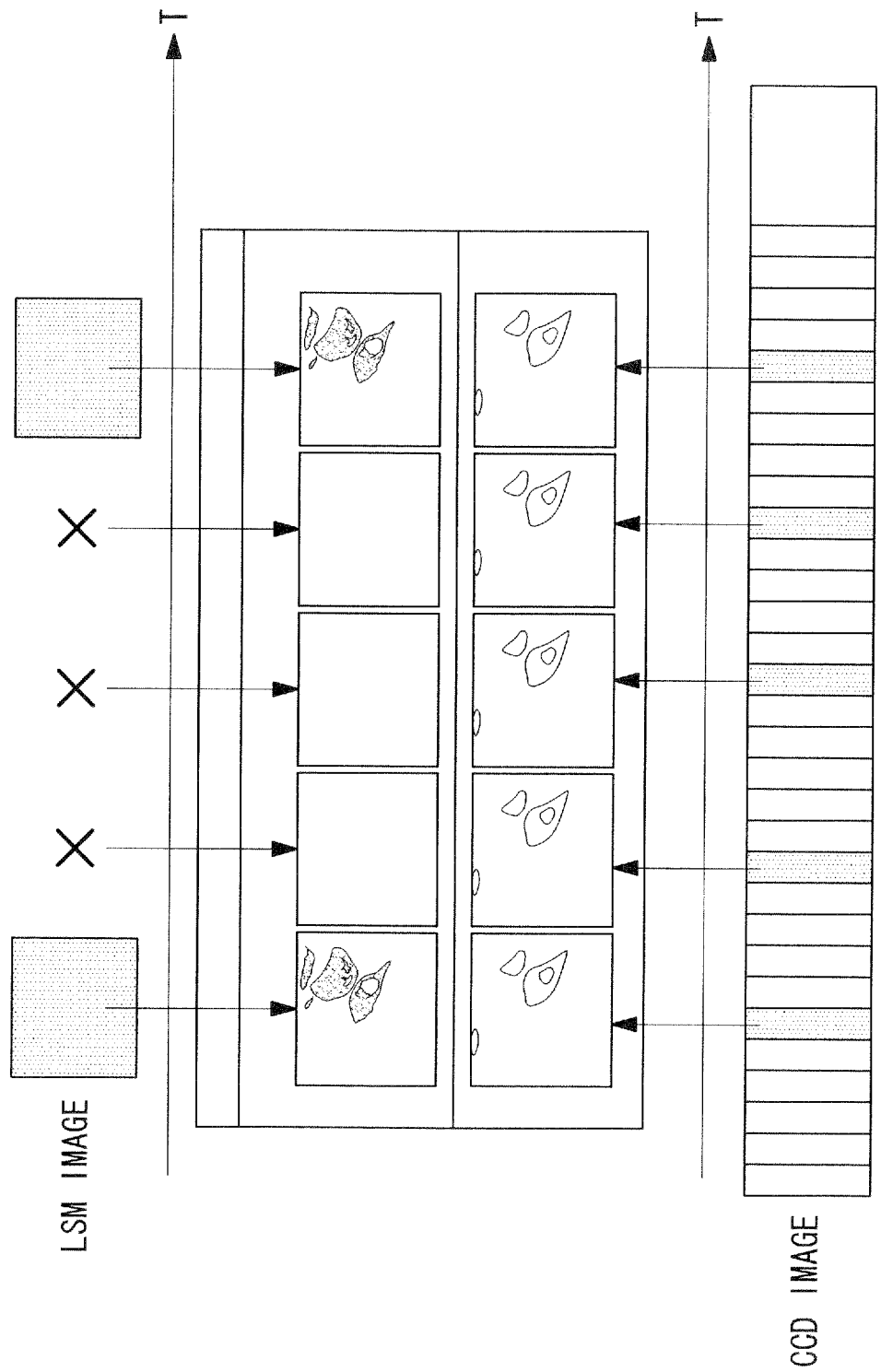
FIG. 11 is a diagram showing an example in which no-acquisition data is displayed in a standard time.

In addition, if no piece of the image information has been acquired in a given standard time by the LSM device 2 or the CCD 4 whose acquisition timing is not the standard; then, it is possible, as shown in FIG. 10, that one piece of image information acquired in a nearest time to the standard time is repetitively displayed; or alternatively, it is also possible, as shown in FIG. 11, that no-acquisition data (image information which indicates that no such information has been acquired) is displayed (show blank) in the standard time when the image information has not been acquired.

Figure 12:
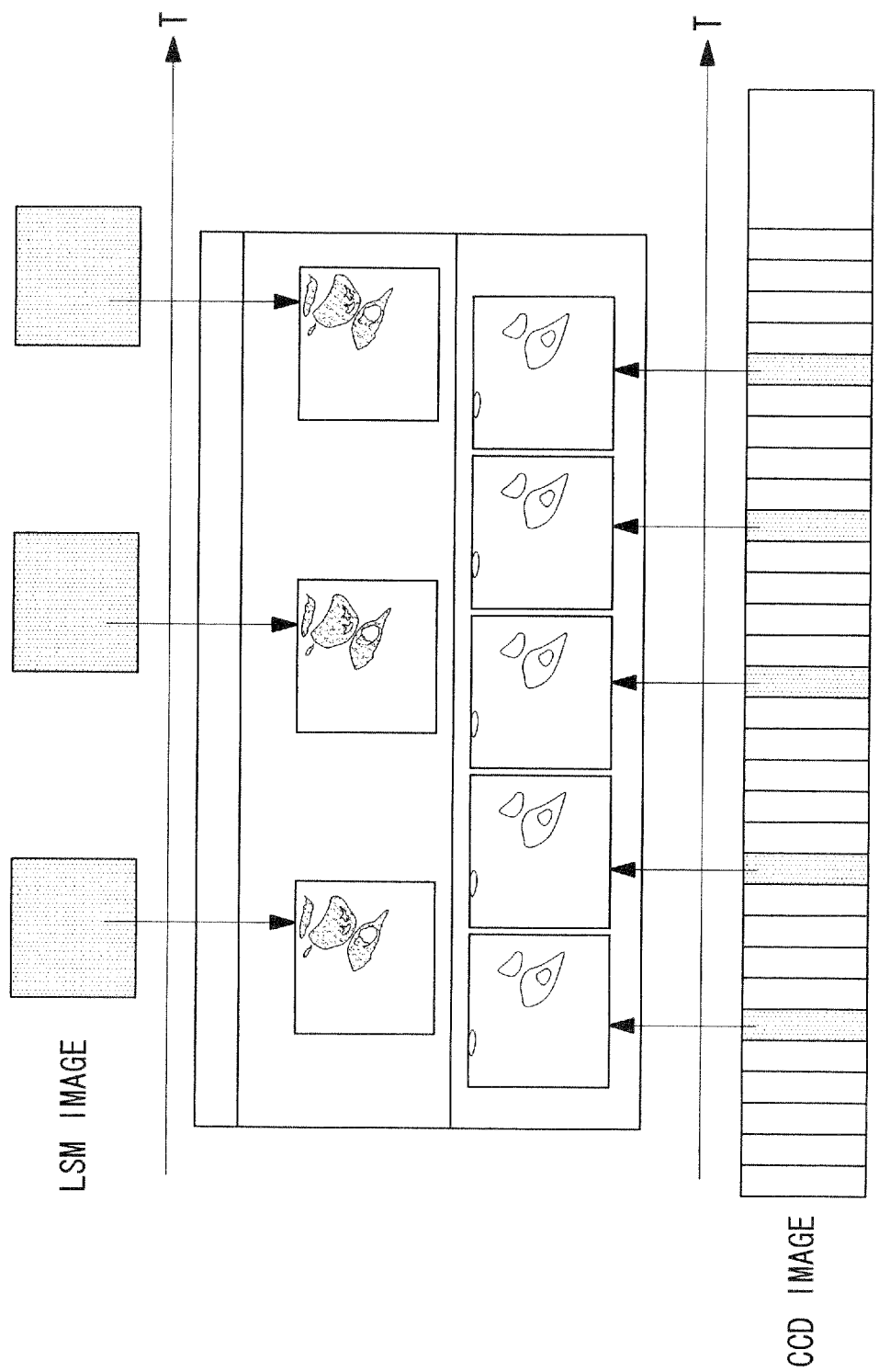
FIG. 12 is a diagram showing an example in which image information whose acquisition timing is not the standard is displayed in positions corresponding to the actual acquisition times.

In addition, it is also possible, as shown in FIG. 12, that the image information acquired by the LSM device 2 or the CCD 4 whose acquisition timing serves as the standard is displayed as per the display standard, while the image information acquired by the LSM device 2 or the CCD 4 whose acquisition timing is not the standard is displayed not by meeting the standard time but in positions corresponding to the actual acquisition times.

Figure 13A:
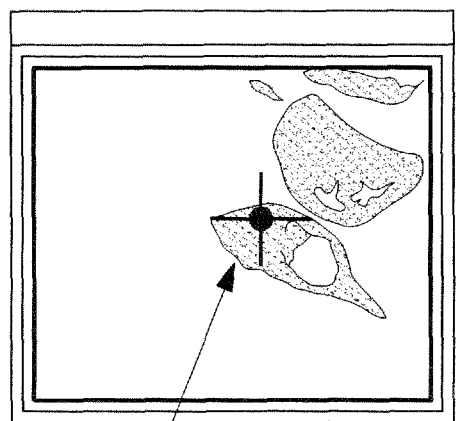
FIG. 13A is a diagram showing LSM image information as a two-dimensional image in which the point region is specified.
Figure 13B:
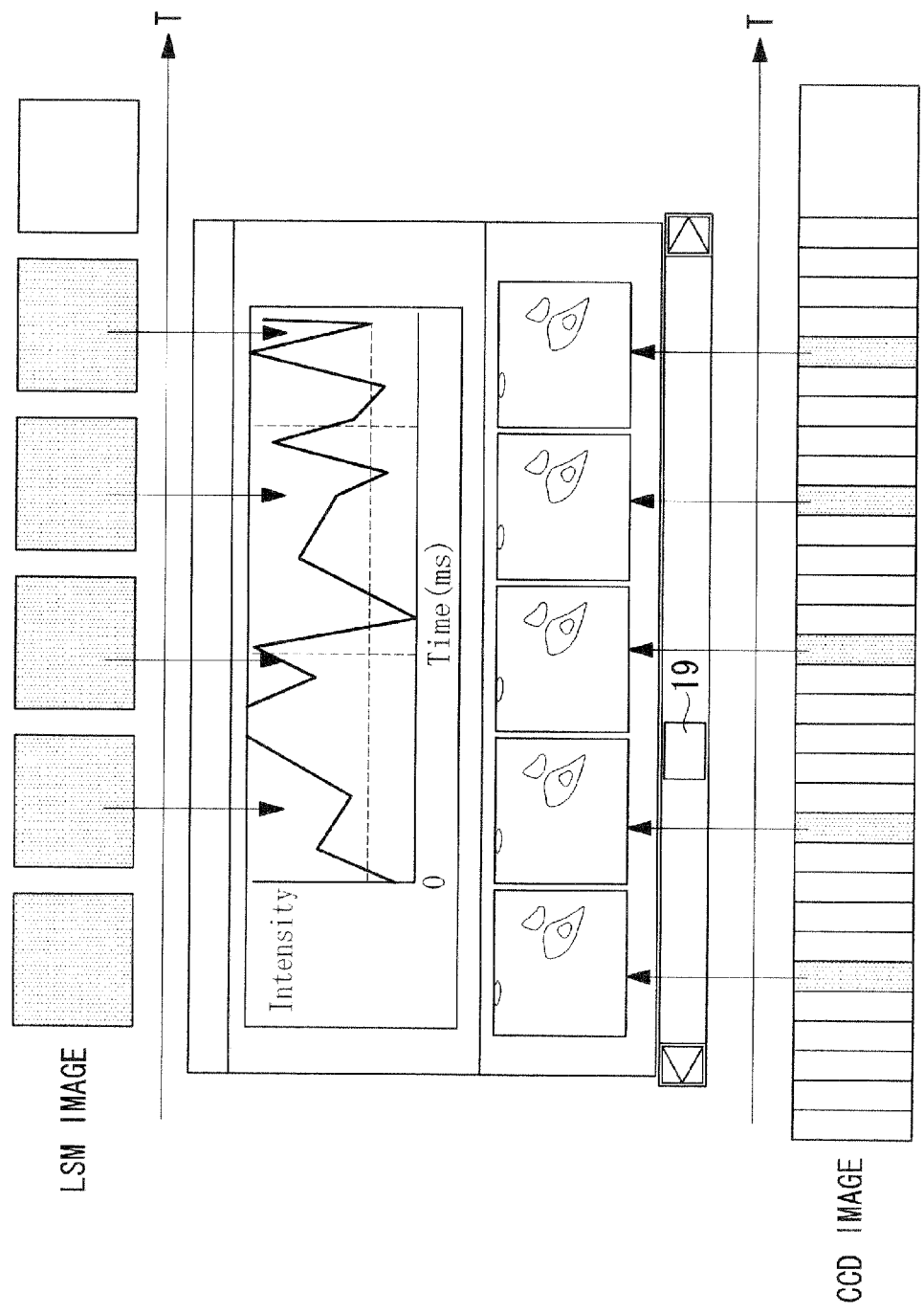
FIG. 13B is a diagram showing a profile image of point scanning of FIG. 13A.
Figure 14A:
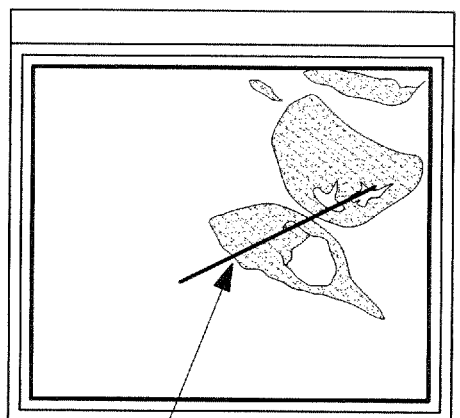
FIG. 14A is a diagram showing LSM image information as a two-dimensional image in which the line region is specified.

Furthermore, this embodiment has been described by exemplifying two-dimensional images as the LSM image information. However, for example, it is also possible that the LSM device 2 acquires a type of image information which indicates a one-dimensional luminance distribution on the specimen A (profile image). For example, the profile image of point-scanned luminance of the specimen A as shown in FIG. 13A and FIG. 13B, or the profile image of line-scanned luminance of the specimen A as shown in FIG. 14A and FIG. 14B, may be displayed. In the profile image serving as the LSM image information of FIG. 13B, the vertical axis shows the intensity and the horizontal axis shows the time.

In the profile image serving as the LSM image information of FIG. 14B, the vertical axis shows the position of each pixel on the line of the line-scanned image where its brightness information is indicated by contrast, and the horizontal axis shows the time.

In this case, the profile image can be created and displayed by sampling pieces of the LSM image information at equal intervals and adjusting the time scale so as to fit the respective pieces of the LSM image information. In addition, it is also possible that the LSM image information (profile image) is set as a standard and the CCD image information (two-dimensional image) is displayed by adjusting its size to fit a desired time interval. Moreover, it is also possible that the CCD image information (two-dimensional image) is set as a standard and the LSM image information (profile image) is displayed by adjusting its time scale to fit the desired time interval. The point or the line may be specified by conducting the point-scanning or the line-scanning before starting the observation, or may be specified by analyzing two-dimensional images after the completion of the observation.

This embodiment can be modified in the following manners.

For example, in this embodiment, the display standard for image information is set before starting the observation (refer to step S3 in FIG. 3); however, instead of this, the display standard can also be set after the completion of the observation of step S15. For example, it is possible that the input unit 6 functions as an image specification unit for specifying a piece of a type of image information displayed on the monitor 7, and the control unit 5 retrieves piece(s) of a different type of image information acquired by a different image information acquisition unit other than the image information acquisition unit that has acquired the specified piece of image information, on the basis of the time information stored in relation to the piece of image information that has been specified by the input unit 6, and displays the thus retrieved piece(s) of the different type of image information on the monitor 7.

Specifically speaking, the configuration may be such that, assuming that CCD image information is being sequentially displayed and observed on the monitor 7, when the user specifies a particular piece of CCD image information by handling the input unit 6, the control unit 5 reads out a piece of time information stored in relation to the specified piece of CCD image information, from the storage unit 9, and retrieves a piece of LSM image information whose time information is near the readout piece of time information in the storage unit 9. Then, the control unit 5 displays the retrieved piece of LSM image information on the monitor 7.

By so doing, an advantage is given in which: if the specimen A makes some change, the detail of which is particularly desired to be observed, during the observation of the entire specimen A by using CCD image information, or in such a situation; piece(s) of LSM image information which is (are) the nearest to the pertinent time can be displayed on the monitor 7 so that the specimen A can be observed more in detail.

Likewise, the configuration may also be such that, when a piece of LSM image information displayed on the monitor 7 is specified, piece(s) of CCD image information near to the pertinent time information of the specified piece is (are) called up.

As mentioned above, the embodiment of the present invention has been described with reference to the drawings; however, it should be understood that specific configurations are not to be limited to this embodiment. Modifications of the design or the like can be made without departing from the gist of the present invention. For example, although the CCD 4 and the PMT 16 have been exemplified as the image information acquisition units in the above-mentioned embodiment, the image information acquisition units are not to be limited to them. It is also possible to employ any other type of image information acquisition unit adopting a different image acquisition method. For example, a CMOS or a resonant scanner may be employed instead of the CCD.

REFERENCE SIGNS LIST

1: Microscope apparatus (observation apparatus)
4: CCD (image information acquisition unit)
5: Control unit (standard setting unit, image processing unit)
7: Monitor (display unit)
8: Timer
9: Storage unit
16: PMT (image information acquisition unit)
S5 and S10: Image information acquisition step
S8 and S13: Storing step
S17: Display step
A: Specimen

The invention claimed is:

1. An observation apparatus which comprises:
a timer for counting time information;
a plurality of image information acquisition devices which are different from each other and which acquire different types of image information;
a memory configured to store image information acquired by the image information acquisition devices by respectively relating each type of the acquired image information to the time information counted by the timer, the image information being acquired in parallel and at respective different image acquiring intervals by the image information acquisition devices;
a controller which is configured to accept an input from a user of a display standard indicating a manner of displaying the image information acquired in parallel at the respective different image acquiring intervals by the image information acquisition devices, and to mutually associate the image information acquired in parallel at the respective different image acquiring intervals by the image information acquisition devices in accordance with the display standard using the time information related to the image information in the memory; and
a display which displays the image information acquired in parallel at the respective different image acquiring intervals by the image information acquisition devices in accordance with the mutual association of the image information by the controller;
wherein the controller is configured to accept, as the input from the user of the display standard, one of (i) a time interval set by the user, and (ii) a time interval selected by the user from among the respective different image acquiring intervals of the image information acquisition devices;
wherein the controller is configured to mutually associate the image information acquired in parallel at the respective different image acquiring intervals by the image information acquisition devices, such that a series of images in a first image group acquired by a first one of the image information acquisition devices at a first time interval and a series of images in a second image group acquired by a second one of the image information acquisition devices at a second time interval that is different from the first time interval are associated with each other in accordance with the display standard that is set by the user; and
wherein the display is configured to display the first image group and the second image group in alignment with each other in accordance with the mutual association performed by the controller.

2. An observation apparatus according to claim 1, wherein the plurality of image information acquisition devices have different resolutions.

3. An observation apparatus according to claim 1, wherein the controller is configured to mutually associate the image information at every preset number of pieces of the image information acquired by the image information acquisition device having the image acquiring interval selected as the display standard.

4. An observation apparatus according to claim 1, wherein the controller is configured to control the display to display the image information acquired by the image information acquisition devices laid out side by side.

5. An observation apparatus according to claim 4, wherein the controller is configured to control the display to display the image information acquired by the image information acquisition devices along a common time line.

6. An observation apparatus according to claim 1, wherein the controller is configured to, if any one of the image information acquisition devices has not acquired a piece of the image information at a time corresponding to the display standard, make the mutual association by using a piece of the image information acquired by said one of the image information acquisition devices at a nearest time to the time corresponding to the display standard.

7. An observation apparatus according to claim 1, wherein the controller is configured to, if any one of the image information acquisition devices has not acquired a piece of the image information at a time corresponding to the display standard, make an association by using image information which indicates that no such information has been acquired.

8. An observation apparatus according to claim 1, wherein the display displays the image information to be scrollable with respect to acquisition time.

9. An observation apparatus according to claim 1, wherein one of the image information acquisition devices is configured to acquire a type of image information which indicates a one-dimensional luminance distribution on a specimen, and another one of the image information acquisition devices is configured to acquire a type of image information which indicates a two-dimensional luminance distribution on the specimen.

10. An observation method which comprises:
acquiring different types of image information from a plurality of image information acquisition devices which are different from each other;

storing the image information acquired by the image information acquisition devices, by respectively relating each type of the acquired image information to time information, the image information being acquired in parallel and at respective different image acquiring intervals by the image information acquisition devices;

accepting an input from a user of a display standard indicating a manner of displaying the image information acquired in parallel at the respective different image acquiring intervals by the image information acquisition devices, wherein the display standard is one of (i) a time interval set by the user, and (ii) a time interval selected by the user from among the respective different image acquiring intervals of the image information acquisition devices;

mutually associating the image information acquired in parallel at the respective different image acquiring intervals by the image information acquisition devices in accordance with the display standard using the time information related to the image information, such that a series of images in a first image group acquired by a first one of the image information acquisition devices at a first time interval and a series of images in a second image group acquired by a second one of the image information acquisition devices at a second time interval that is different from the first time interval are associated with each other in accordance with the display standard that is set by the user; and displaying the image information acquired in parallel at the respective different image acquiring intervals by the image information acquisition devices in accordance with the mutual association of the image information, so as to display the first image group and the second image group in alignment with each other in accordance with the mutual association.

11. An observation apparatus according to claim 1, wherein the display is configured to display the first image group and the second image group using frame by frame playback in accordance with the mutual association performed by the controller.

* * * * *